Figure 1:
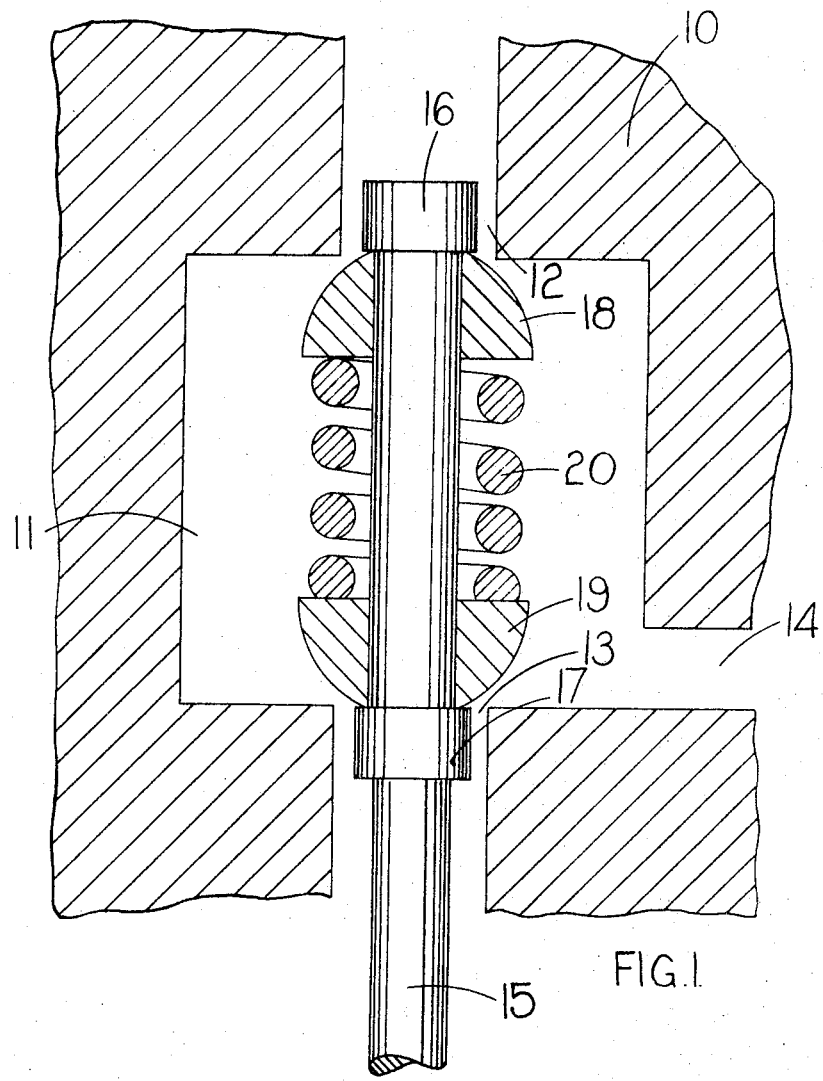

United States Patent

Walton

[15] 3,664,235
[45] May 23, 1972

[54] FLUID PRESSURE OPERATED SERVO ARRANGEMENT

[72] Inventor: Peter Walton, Gloucester, England
[73] Assignee: Serck Industries Limited, Birmingham, England
[22] Filed: May 13, 1970
[21] Appl. No.: 36,803

[30] Foreign Application Priority Data

Sept. 22, 1969 Great Britain......................46,487/69

[52] U.S. Cl..............................91/387, 91/165, 137/625.27
[51] Int. Cl........................................................F15b 13/16
[58] Field of Search....................91/165, 387, 386, 385, 417, 91/457, 469; 137/625.27

[56] References Cited

UNITED STATES PATENTS

| 796,706 | 8/1905 | Clark | 92/37 X |
|---|---|---|---|
| 1,801,483 | 4/1931 | Bragg et al. | 91/457 X |
| 2,582,626 | 1/1952 | Escher | 91/457 X |
| 2,925,066 | 2/1960 | Thorner | 91/469 X |
| 2,966,891 | 1/1961 | Williams | 91/387 |
| 3,195,416 | 7/1965 | Linquist | 91/165 |

FOREIGN PATENTS OR APPLICATIONS

| 1,320,167 | 1/1963 | France | 91/387 |

Primary Examiner—Martin P. Schwadron
Assistant Examiner—Irwin C. Cohen
Attorney—Holman & Stern

[57] ABSTRACT

A servo arrangement includes a valve having a chamber into which opens a pair of aligned ports and a third port. A stem is movable within the pair of ports and carries a pair of closure members for the ports. The closure members are biased apart against stops so that in a mid-position of the stem both of the pair of ports are open to the third ports. When the stem has moved to shut one port, continued movement in the same direction allows a large flow through the other port. The servo arrangement also includes an actuating piston and a valve operating device responsive to a signal pressure and to the piston position. The valve controls the pressure supplied to one side of the piston.

1 Claim, 3 Drawing Figures

FLUID PRESSURE OPERATED SERVO ARRANGEMENT

This invention relates to valve arrangements for controlling fluid flow and has for an object the provision of a valve in a convenient form.

A valve according to the invention comprises a body, a chamber within the body, a pair of ports in the chamber, a third port also opening into the chamber, a valve stem extending between the said pair of ports, a pair of closure members slidable on the valve stem and respectively associated with the pair of ports, means upon the stem for retaining the closure members thereon at a given maximum spacing and means for biasing each said closure member towards a respective one of the retaining means, the arrangement being such that movement of the stem to urge a closure member against its biasing means results in an increase in the fluid flow between the port associated with that closure member and the third port.

The invention also resides in the use of a valve arrangement according to the invention in a servo arrangement including a fluid pressure operated actuating means, a valve operating means responsive to a fluid pressure signal and adapted to position the valve stem in accordance with the said signal and a means for applying to the valve operating means a force dependent on the position of the said actuating means, the valve arrangement acting, in use, to supply a fluid pressure to one side of the actuating means and/or to bleed pressure therefrom.

Figure 2:
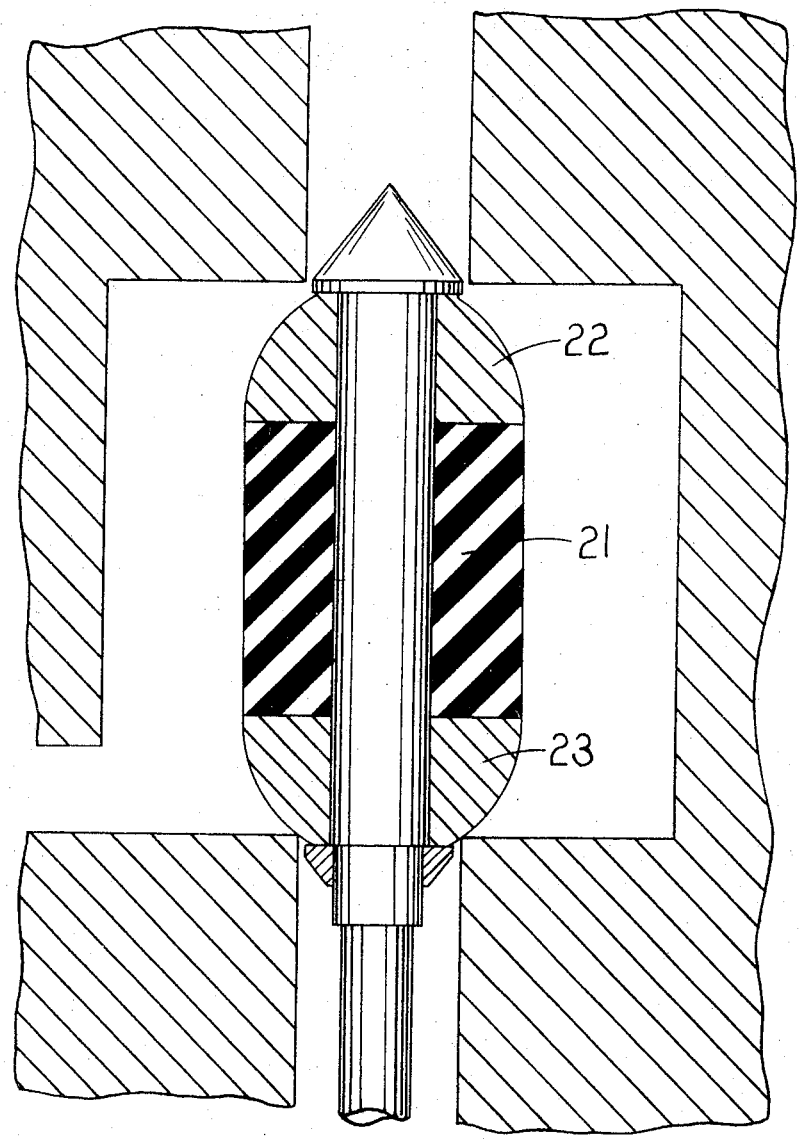
Figure 3:
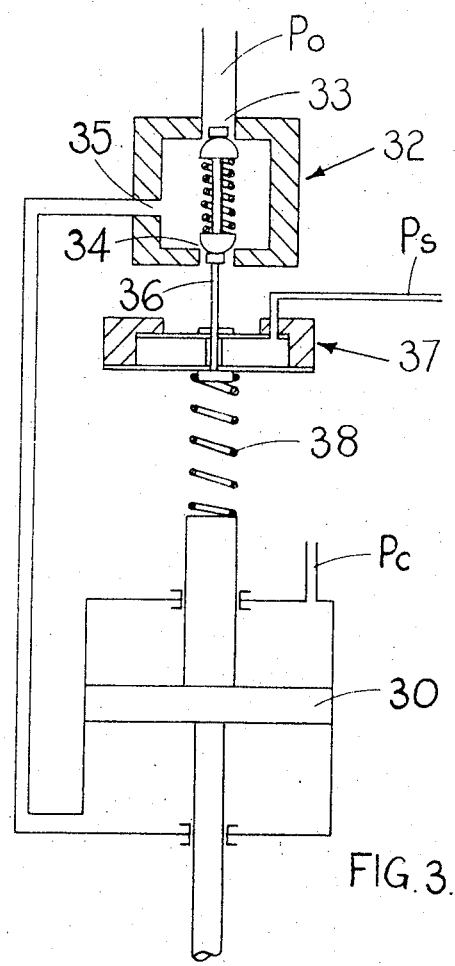

Embodiments of the invention will now be described by way of example and with reference to the accompanying drawings in which FIG. 1 shows somewhat diagrammatically a section through a valve, FIG. 2 shows a similar section through an alternative form of valve, and FIG. 3 shows, somewhat diagrammatically, an apparatus incorporating a valve arrangement according to the invention.

The valve shown in FIG. 1 has a body 10 which defines a chamber 11 into which open two axially aligned ports 12, 13. A third port 14 also opens into the chamber 11. A valve stem 15 extends through the ports 12, 13 and includes a pair of axially spaced collars 16, 17. A pair of closure members 18, 19 for the ports 12, 13 respectively are slidable on the stem 15 and are biased against the respective collars 16, 17 by a spring 20. The spacing of the collars 16, 17 is such that the ports 12, 13 may be opened simultaneously. The stem 15 has an equilibrium position in which both ports 12, 13 are open. The stem 15 may be moved axially by an external means (not shown) to cause one of the closure members 18, 19 to seat on its associated port and the other of the closure members to permit an increased flow through the other of the ports. Subsequent movement of the stem 15 in the same direction compresses the spring 20 and allows flow through the open port to further increase.

The foregoing arrangement has the disadvantage that leakage may occur down the bore of a closure member which is seated on its associated port. An alternative form of valve shown in FIG. 2 is generally similar but the spring is replaced by a resilient sleeve 21, conveniently formed of silicone rubber. The sleeve 21 is subjected to an initial compression by closure members 22, 23. Fluid leaking down the bores of the members 22, 23 cannot therefore escape into the chamber. The retaining collars are, as shown, tapered to control fluid flow through their associated ports when the respective ports are open.

A valve arrangement of the foregoing kind may be incorporated into a servo arrangement as shown in FIG. 3, in which an actuator in the form of a piston 30 is subjected one one side to a pressure derived from an operating air pressure $P_o$ and on the other side to a constant biasing air pressure $P_c$. A valve 32, substantially as previously described, has ports 33, 34, 35 communicating with $P_o$, atmosphere and the side of the piston 30 remote from the biasing pressure $P_c$. The valve stem 36 is movable by a double diaphragm arrangement 37 comprising a pair of diaphragms having different areas and restrained so as to move in unison. A signal pressure $P_s$ is introduced between the diaphragms. Increase or decrease in $P_s$ causes the diaphragm assembly 32 to move the stem 36 in respective directions to close ports 34 or 33. The diaphragm assembly 37 is also subjected by means of a spring 38 to a force dependent on the position of the piston 30. The stem 36 thus adopts a position dependent on the valve of $P_s$ and on the position of the piston 30, and in equilibrium this position is such that ports 33, 34 are both open, the flow of air through these ports resulting in a force on the piston 30 which balances that applied by the pressure $P_c$ and the spring 38. An increase in $P_s$ causes port 34 to shut and port 33 to open wider, urging the piston 30 upwards as seen in the drawing until equilibrium conditions are restored. A decrease in $P_s$ similarly causes a downward movement of the piston 30.

The incorporation of a valve arrangement 32, according to the invention, has the effect that in equilibrium the flow of air through ports 33, 34 is very small, but a relatively large movement of the stem 36 is possible to permit a correspondingly large flow of air through a respective one of the ports 33, 34 the other one of the ports being shut. Movement of the piston 30 in response to a large change in $P_s$ is thus rapid.

I claim:

1. A servo arrangement including a fluid-pressure operated actuating means, a valve operating means responsive to a fluid pressure signal, means for applying to the operating means a force dependent on the position of the actuating means, a valve comprising body, a chamber within the body, a pair of ports in the chamber, a third port also opening into the chamber and communicating with the actuating means, a valve stem extending between the said pair of ports and positioned by the valve operating means, a pair of closure members slidable on the valve stem and respectively associated with the pair of ports, means upon the stem for retaining the closure members thereon at a given maximum spacing, the retaining means being tapered and lying within the respective ports of the said pair of ports, a resiliently deformable member between the closure members for biasing each said closure member towards a respective one of the retaining means, said resilient member also forming a seal against said valve stem to prevent escape of fluid between the closure members and the valve stem, the arrangement being such that movement of the stem to urge a closure member against its biasing means results in an increase in the fluid flow between the port associated with that closure member and the third port, said flow being controlled by said tapered retaining means, said stem being movable to a position in which both of said pair of ports communicate with the third port, the valve acting, in use, to supply a fluid pressure to one side of the actuating means and to bleed pressure therefrom.

* * * * *